(No Model.)
A. I. AMBLER.
PROCESS OF MANUFACTURING GAS OR VAPOR FROM PETROLEUM.
No. 247,981. Patented Oct. 4, 1881.
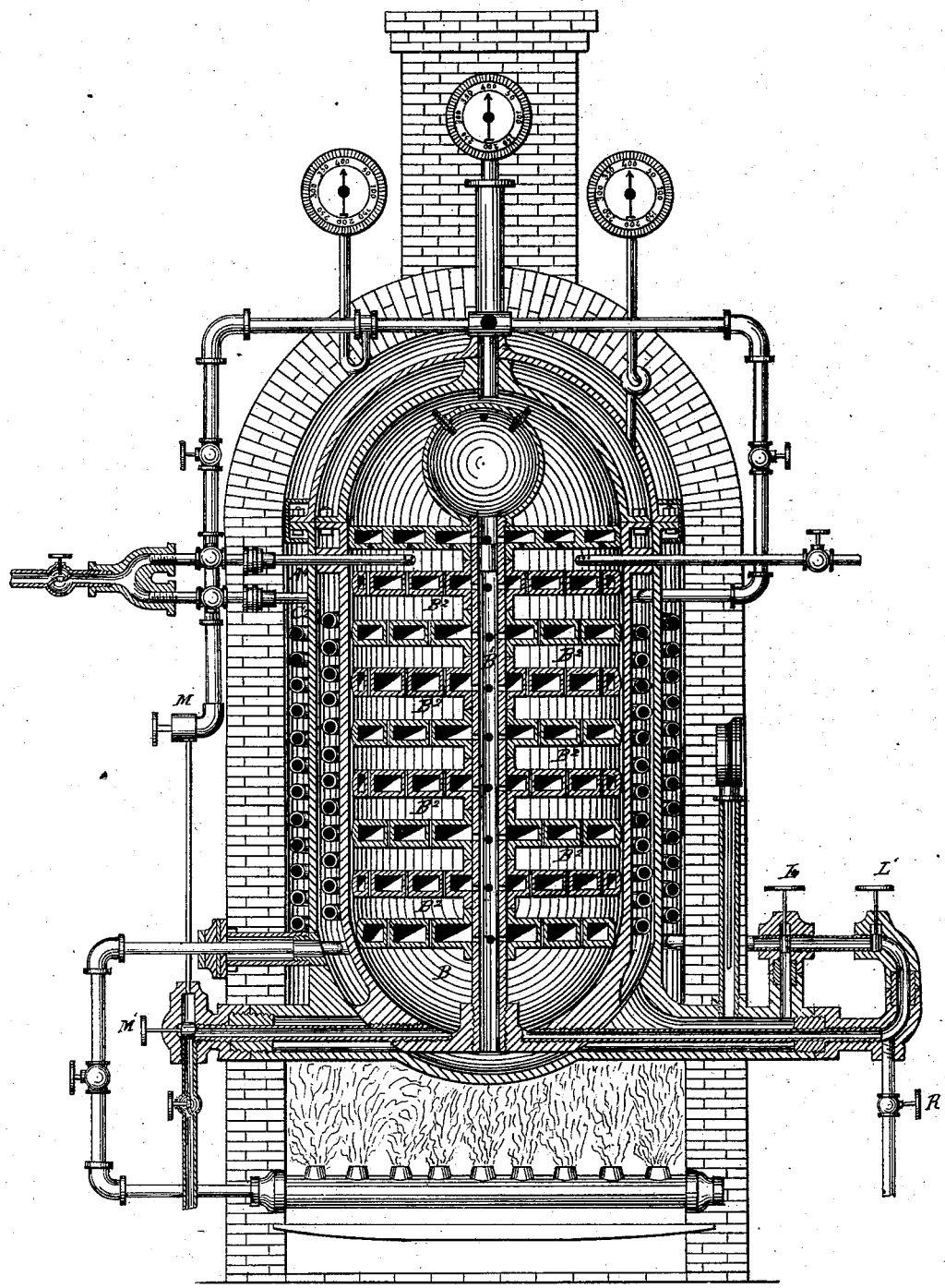
Witnesses
John A. Tauberschmidt
A. Ruppert
A. I. Ambler, Inventor
D. P. Holloway, Atty

UNITED STATES PATENT OFFICE.

AUGUSTIN I. AMBLER, OF WASHINGTON, DISTRICT OF COLUMBIA, ASSIGNOR TO THE INTERNATIONAL VAPOR FUEL CARBON IRON AND MANUFACTURING COMPANY, OF SAME PLACE.

PROCESS OF MANUFACTURING GAS OR VAPOR FROM PETROLEUM.

SPECIFICATION forming part of Letters Patent No. 247,981, dated October 4, 1881.

Application filed September 7, 1880. (No model.)

*To all whom it may concern:*

Be it known that I, AUGUSTIN I. AMBLER, a citizen of the United States, residing at Washington, in the county of Washington and District of Columbia, have invented certain new and useful Improvements in Processes of Manufacturing Gas or Vapor from Petroleum; and I do hereby declare the following to be a full, clear, and exact description of the invention, such as will enable others skilled in the art to which it appertains to make and use the same, reference being had to the accompanying drawing, and to letters or figures of reference marked thereon, which form a p rt of this specification.

My invention relates to a process for the manufacture of gas or vapor from petroleum suitable for being used as fuel in furnaces for smelting and puddling iron, heating steel, generating steam, and generally for use in various kinds of furnaces in which a high degree of heat is desirable, the same process being adapted to the production of a valuable lubricating-oil, which may be drawn from the apparatus during the operation of generating the gas or vapor.

My present invention consists in the hereinafter-described process of generating gas or vapor from petroleum, and at the same time and by the same apparatus producing a lubricating-oil of the requisite specific gravity.

The steps required for carrying out my process are as follows:

First, a quantity of petroleum or other hydrocarbon oil is placed in a vessel of any suitable form and dimensions, it being so arranged that a jet or current of superheated steam or steam at a high temperature not superheated can be injected into the body of the oil and into direct contact with the same for the purpose of vaporizing it, or such portion thereof as is capable of being vaporized without undergoing destructive distillation, that portion of the oil not converted into vapor remaining in the vessel until its specific gravity has been raised to the requisite point, when it may be drawn off through a cock or valve provided for the purpose and used as a lubricant for all sorts of machinery.

The second step consists in providing steam-heated surfaces, through or over which the vapor generated as described in the first step of this process passes, the steam used for this purpose having been previously superheated to such an extent as to convert the vapor and any fine globules of oil that may be in the vessel or vessels or upon the surfaces over which the vapor passes into a dry gas, which may be collected in any suitable chamber within the generating apparatus.

The third step in my process consists in mingling with the oil-vapor superheated steam in such quantities as shall be found advantageous and as shall cause the mingled product to burn to the best advantage, the quantity of steam thus used being in bulk a volume about one-third that of the vapor with which it is mingled, the steam for this purpose being admitted to the vessel or chamber in which the vapor is stored for the time being in regulated quantities, and the gas, after the admixture has taken place, taken off through suitable pipes and conducted to the point where it is to be burned.

I have shown in the accompanying drawing one form of apparatus adapted to the carrying out of my process; but I do not confine myself to any particular form or construction of the apparatus used, as it is apparent that it may be of various forms and yet produce the effect or effects above described.

The device illustrated in the drawing just alluded to consists of two vessels of cast-iron or other suitable material, their upper ends being removable one within the other, the inner one having in its lower end a reservoir, B, in which the oil not vaporized in its passage through the apparatus is collected, and from which it is drawn in the form of lubricating-oil through the valve R, or in any other manner.

The oil to be treated in a generator of the type shown is admitted in regulated quantities through the valve S, it being forced in by its own gravity or by a pump connected with the induction-pipe. Upon entering the interior vessel it falls down upon a series of steam-heated chambers, $B^2$ $B^2$, passing through apertures formed therein into the reservoir B, where steam is admitted into direct contact therewith through the pipe controlled by the valve L', the steam having been previously superheated or raised to such a pressure as to have the effect of vaporizing all the oil in the reservoir capable of being vaporized without producing destructive distillation. This introduction of steam into the body of the oil, as above stated, constitutes the first step of my process. As the vapor rises from the oil in the reservoir or chamber B it is made to pass over and through a series of steam-heated chambers or diaphragms, $B^2$ $B^2$, into which steam passes from the vertical pipe B'. In rising from the reservoir B the vapor comes in contact with and passes through the heated diaphragms $B^2$ $B^2$ and is adheated, and any small globules of oil that may be held in suspension by it or that may adhere to the surfaces of the chambers will be vaporized, and thus the requirements of my second step are fulfilled.

It will be observed that by regulating the quantity of steam admitted to the body of the oil and to the heating-surfaces the parts may be so regulated as to their temperature that the formation of solid carbon thereon will be avoided, and the oil drawn off will be of the desired quality for lubricating purposes, its condition being always ascertainable by the glass tube arranged between the valves $m$ and $m'$.

For the purpose of carrying out the third step of my process it is necessary that the quantity of steam admitted to the body of the oil should be regulated as well as its temperature. To accomplish this suitable valves are placed in the induction-pipe, and a steam-gage and a pyrometer are also attached thereto, by which the pressure and temperature of the ingoing steam may be determined. It is important that the temperature and quantity of the steam entering the body of the oil should be carefully regulated, as upon this depends, to a great extent, the quality of the gas as it is taken from the apparatus to be burned, and also the quality of the lubricating-oil. The steam which enters the body of the oil passes up through it, and, mingling with the vapor thereof, forms a gas suitable for use for the purposes above enumerated, it being taken from a chamber or reservoir in the upper portion of the interior vessel and conducted to suitable burners.

As before stated, the above-described apparatus is only one form capable of producing the results claimed, and it is susceptible of various changes of form without any departure from the principle of my invention.

I make no claim in this application to the apparatus shown, that constituting the subject-matter of another application, it being shown and described here only as an illustration of one method of practicing my process.

Having thus described my invention, what I claim, and desire to secure by Letters Patent, is—

The herein-described process for producing hydrocarbon gas and lubricating-oil from petroleum, said process consisting of the following successive steps, viz: first, the introduction of a regulated quantity of steam at a regulated temperature into a body of oil inclosed in a chamber or reservoir for the purpose of vaporizing a portion thereof and converting the balance into lubricating-oil; second, causing the vapor arising from the oil to pass through or over a series of steam-heated surfaces for the purpose of adheating the same and converting into vapor any globules of oil that it may hold in suspension or that may adhere to the surfaces over which it passes; and, third, mingling superheated steam with the vapor of the oil before it is burned and passing the same over steam-heated surfaces, all substantially as described, and for the purposes set forth.

In testimony whereof I affix my signature in presence of two witnesses.

AUGUSTIN I. AMBLER.

Witnesses:
C. M. CONNELL,
D. L. HOLLOWAY.